Figure 1:
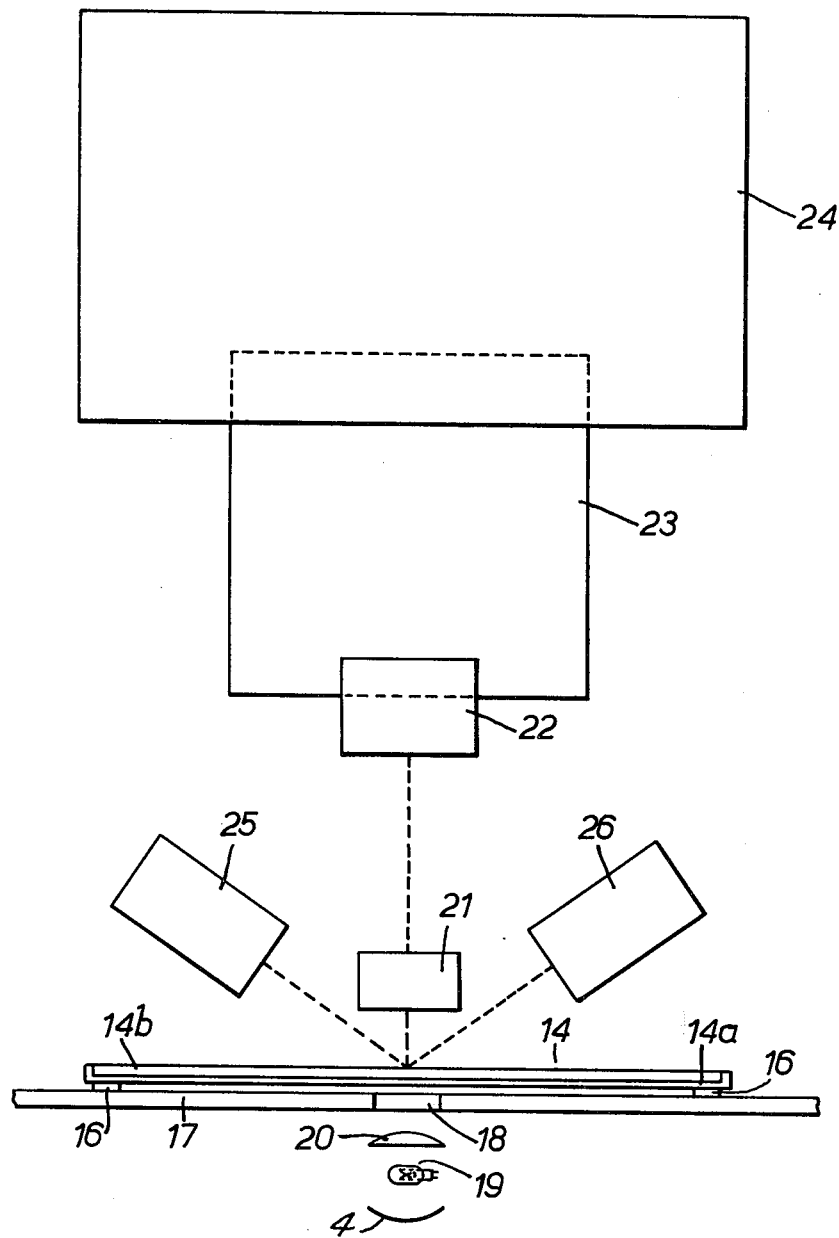

United States Patent [19]

Shaw

[11] 4,027,957
[45] June 7, 1977

[54] ILLUMINATED OPTICAL VIEWERS

[75] Inventor: Victor Henry Shaw, Broadstone, England

[73] Assignee: Plessey Handel und Investments A.G., Switzerland

[22] Filed: Sept. 25, 1975

[21] Appl. No.: 616,690

[30] Foreign Application Priority Data

Sept. 28, 1974 United Kingdom ............ 42231/74

[52] U.S. Cl. ............................................... 353/21
[51] Int. Cl.$^2$ ...................................... G03B 21/00
[58] Field of Search .................. 353/21, 44, 63, 64

[56] References Cited

UNITED STATES PATENTS

| | | | |
|---|---|---|---|
| 3,244,067 | 4/1966 | Jonker et al. | 353/27 R |
| 3,385,162 | 5/1968 | Gaudyn | 353/63 |
| 3,409,361 | 11/1968 | Hynes et al. | 353/27 R |
| 3,512,883 | 5/1970 | Noble | 353/64 |
| 3,733,121 | 5/1973 | Smitzer | 353/27 R |

FOREIGN PATENTS OR APPLICATIONS

| | | | |
|---|---|---|---|
| 487,281 | 12/1929 | Germany | 353/44 |

Primary Examiner—Steven L. Stephan
Attorney, Agent, or Firm—Fleit & Jacobson

[57] ABSTRACT

An illuminated optical viewer for facilitating corrective operations on an object comprises a work platform which can be moved along two mutually perpendicular coordinates and on which in use of the viewer the film negative or other object to be touched-up or to have any faults corrected will be positively located first optical means projecting an enlarged objective image of a small area of the object, located at one position, on to a screen, second optical means producing an enlarged stereoscopic virtual image of a portion placed at a second position displaced from said one position by a predetermined distance in a predetermined direction, said virtual image being formed in substantial alignment with the portion of the object at said second position, scanning means for adjustably moving the object along two co-ordinates of a plane, and two-position changeover means for so shifting the object as to displace an object portion which is located at said one position to said second position without affecting the adjustment of the scanning means.

6 Claims, 3 Drawing Figures

ILLUMINATED OPTICAL VIEWERS

This invention relates to optical viewers and relates more specifically to such viewers especially for use in touching-up film negatives of printed-circuit layouts or in the correction of solder faults on printed-circuits boards. It is an object of the invention to provide an optical device for facilitating corrective operations on a substantially flat object which, in addition to permitting the object to be checked by scanning small surface elements along two mutually perpendicular co-ordinates, with a greatly enlarge image of a scanned point appearing on a projecting screen but which at the same time permits corrections to be effected on any surface element when a fault of this element has been detected on the projecting screen by affording greatly enlarge binocular subjective viewing of an element identified by the scanned projection while permitting access to the thus identified element without the need of removing the object from the scanning projector device, thus readily permitting, after the correction has been effected, the scanning to continue from the corrected element without the need for any complicated remounting and readjusting operations.

According to one aspect of the present invention an optical viewer for facilitating such corrective operations comprises a platform which can be moved along two mutually perpendicular co-ordinates and on which in use of the viewer a film negative or other object to be touchedup, or to have any faults thereon corrected, will be positively located magnifying means for illuminating the object and for projecting an enlarged image of a small portion thereof on to a screen; magnifying means producing, when an object has been moved to displace said portion by a predetermined distance in a predetermined direction parallel to the plane determined by said co-ordinates, an enlarged stereoscopic virtual image of said portion of the object, in a line with the actual position of said portion; and two-position change-over means which, when moved from a first position to their other position, effect, without affecting the adjustment of the scanning means, displacement of the object by said predetermined distance in said predetermined direction, to facilitate correction of any fault thereon displayed on the screen.

Preferably the platform is movable along two mutually perpendicular co-ordinates by a simple push-pull action. The platform may be slidably mounted on a slide bar for movement along one -co-ordinate whilst movement along the other co-ordinate is made incremental by the provision of a so-called click-stop mechanism which may conveniently comprise a spring-urged member which releasably engages perforations or indentations provided along a strip to which the platform is attached.

In carrying out the present invention according to the above-mentioned aspects, the means for illuminating a film negative on the platform and projecting an image thereof on to the screen may comprise a light source with an associated lens/mirror and filter system located below said platform. The latter may be transparent (e.g. glass), and the illuminating means may be arranged to illuminate the film negative from below so that an enlarged image of the negative is projected on to the viewing screen through an adjustable projection lens and mirror system mounted above the platform.

When the viewer is to be used for detecting and correcting faults in printed circuit boards the means for illuminating a printed circuit board on the platform may comprise a pair of lamp units including reflector and lens systems arranged to illuminate the top of the board from two sides so that a three-dimensional image of the board connections can be produced on the screen. The projection means may comprise a lens system which receives the light reflected from the board and transmits the image to successive mirrors the last of which reflects the image on to the back of a translucent screen (e.g. ground glass).

The second optical means may comprise a large single convex lens or binoculars may be fixed in position on the viewer for viewing a film negative or other object on the platform.

Figure 2:
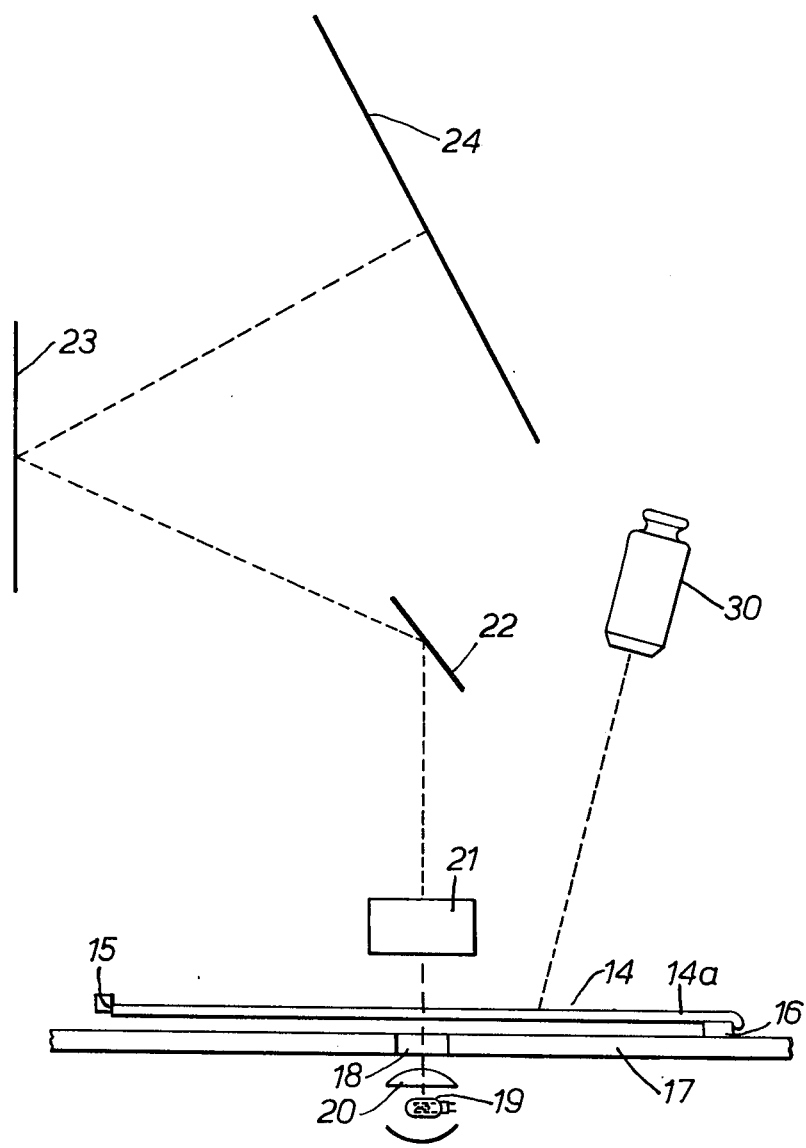
Figure 3:
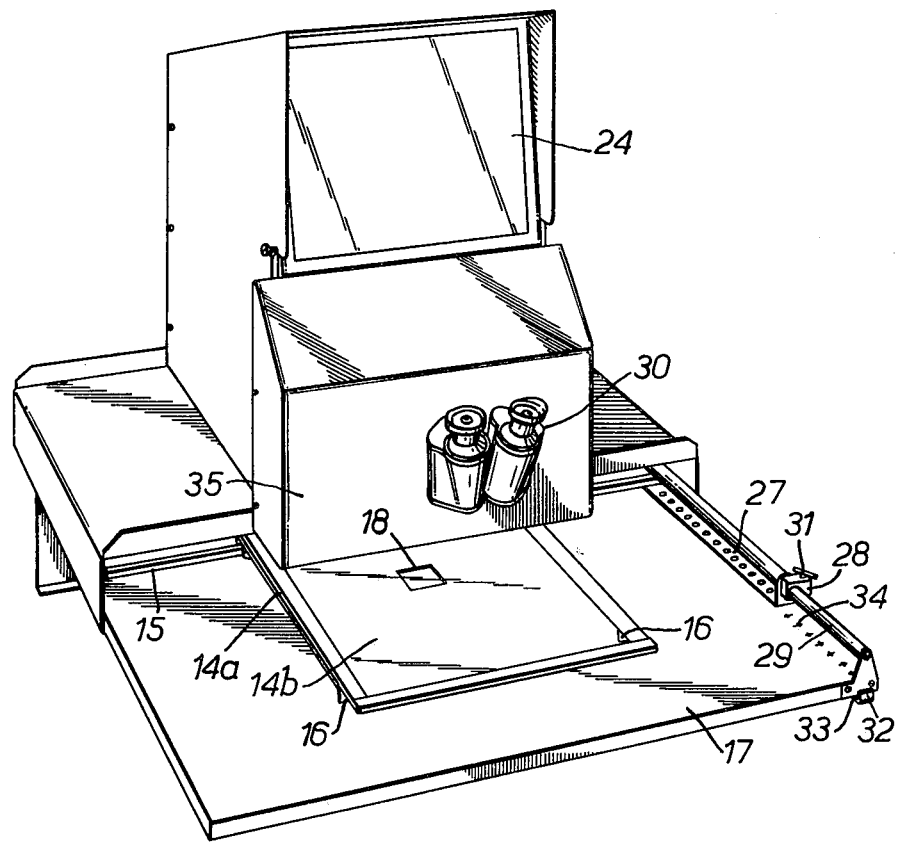

By way of example the present invention will now be described with reference to the accompanying drawings, in which:

FIGS. 1 and 2 are diagrammatic front and side views respectively, of the optical system of an optical viewer which affords illumination from below and above, facilitating film touch-up and solder fault correction on printed circuit boards, respectively; and, FIG. 3 is a perspective view of the viewer of FIGS. 1 and 2 showing the mounting of the binoculars and the mounting arrangement for the platform to provide push-pull movement thereof with incremental movement along one co-ordinate.

Referring now to the drawings, the viewer shown comprises a transparent plate (e.g. glass) defining a platform 14 which is arranged for movement in mutually perpendicular directions. This platform 14 may include clip means (not shown) for securing a film negative to the platform, or such film negative could be secured to the platform by means of adhesive tape. For the purpose of illuminating the film negative from below the platform 14, a light source 19, a beam producing concave mirror 4, and a convex lens 20 are located below the transparent platform 14. The platform 14 includes a metal-frame 14a. This metal frame 14a receives a transparent (e.g. glass) plate 14b or when the viewer is to be used for printed circuit board inspection and fault rectification the frame 14a may receive an adjustable frame providing slots for receiving the edges of a printed circuit board to be inspected. The platform 14 is slidably mounted on a slide bar 15 and has secured to its underside low friction pads 16 which rest on the upper smooth surface of an opaque base board 17. This base board 17 has a rectangular aperture 18 which permits a light beam from the lamp 19 and lens 20 to be transmitted upwards through the board 17 on to the underside of the platform 14. When the platform includes the transparent plate 14b, the light beam, after passing through the platform 14 and a projection lens system 21, is reflected by plane mirrors 22 and 23 on to the back of a screen 24, which may be of translucent glass.

It will thus be appreciated that when a film negative is secured to the transparent plate of platform 14 and the platform is so positioned that the negative is located over the aperture 18, an image of at least a part of the negative will be displayed on the screen 24. The viewer also provides for the illumination of the top surface of an object positioned on the platform 14. Such illumination may be used for the detection of solder faults on a printed-circuit board which is mounted on platform 14 by means of an adjustable slotted frame as aforesaid.

Top illumination is provided by two lamp units 25 and 26 including associated mirror/lens assemblies which produce light beams falling on the top of the platform 14 directly above the aperture 18. A printed circuit board carried by the platform 14 will therefore have the part thereof located over the aperture 18 optically projected on to the screen 24, to two light beams serving to afford a three-dimensional projected image of the printed circuit board on the screen 24.

As will best be appreciated from FIG. 3 of the drawings, the platform 14 is slidably mounted on the cross slide bar 15 so that the platform can be slidably moved from side to side over the baseboard 17. The slide bar 15 is fixedly secured to a perforated strip 27 having an apertured upturned flange 28 which is slidably mounted on fixed rod 29. The platform 14 can therefore be moved forward and backwards by the operator by a simple push-pull action. As the platform 14 is moved forwards or backwards, the movement is incremented by a click-stop mechanism which comprises a spring-urged plunger or ball which engages successive perforations along a strip 27 as the platform is pushed or pulled, as the case may be. Thus it will readily be appreciated how thorough scanning of the film negative or other object being viewed on the viewer can be achieved.

For the purpose of making possible enlarged stereoscopic in-line viewing of the part of a film negative or printed circuit board displayed on the screen 24 during operation of the viewer, binoculars 30 are provided which can be moved towards or away from the platform 14 for focussing purposes. The binocular axis intersects the platform at a position spaced from the aperture 18, as can best be seen from FIG. 3, so that, on order to use the binoculars to facilitate the correction of faults detected on the displayed object, without removing an object from the platform the object-carrying element of the platform 14 will need to be moved in order to view the previously displayed faulty part through the binoculars, thereby also facilitating access to the faulty part. For this purpose the platform 14 includes a top part which may be a glass plate 14b, and which is slidable on the frame 14a of the platform 14 from a first end stop to a second end stop by a fixed amount equal to the distance between the centre of the aperture 18 and the axis of binoculars 30. Accordingly, when a film-negative fault or solder fault is detected on the screen at any one scanning position, the top part of the platform 14 is pulled forward to the full extent determined by limit stops in order to bring the faulty part into a position aligned with the binoculars in readiness for film touch-up or fault correction. After the completion of this treatment, such scanning position can be readily restored by simply sliding the top part of the platform back on the frame 14a to the said first limiting stop.

In operation of the viewer, the film negative or printed circuit board will be secured to the top part 14b of the platform 14 in any of the ways previously mentioned. Alternatively, a non-slip mat may be carried by the platform when a flat printed circuit board is to be scanned, or the platform 14 may include a vacuum suction plate for holding a film negative in position.

The appropriate lamps will be energized according to whether bottom or top illumination of the object on the platform 14 is required. The the platform 14 may then be pulled towards the front of the board 17 until the front edge of the object is seen on the screen with the click-stop mechanism positively locating the platform 14 in position. With the platform 14 in this position, a screw adjuster stop member 31 on the fixed rod 29 is moved so that it abuts against apertured flange 28 as shown in FIG. 4, and is secured firmly to the rod in that direction. This identifies the starting position for scanning successive printed circuit boards of a batch.

The platform 14 may now be slidably moved across the board 17 so that the object is optically scanned on the screen 24 from one side edge of the object to the other side edge. At the end of the traverse, the platform 14 may be pushed away from the front of the viewer until the click stop plunger engages the next perforation on the strip 27. The platform is then moved back across the board 17 after which platform 14 is pushed to the next-following click-stop position prior to the next traverse in the reverse direction. At any time during scanning operations when a fault is detected on the screen, the top part of the platform only which carries the object, may be pulled, relative to the remainder of the platform towards the front of the viewer so that the fault can now be seen through the binoculars 30. The binoculars vision provided by the binoculars enables the negative to be touched up or solder faults to be rectified, thus avoiding the need of removing the object from the projector for touching up and then replacing it and readjusting it for continuing the checking operation.

As can best be seen from FIG. 2 the binocular axis is not perpendicular to the platform 14, and consequently the inside surface of the holes in a printed-circuit board can be viewed for the purpose of examining through-plating of holes, for instance.

By referring to FIG. 3 it will be seen that an upturned flange 32 of a slidably mounted bar 33 is located at the right hand side of the board 17. This bar 33 may be pulled forwards to render the click-stop mechanism inoperative. It will also be seen that a row of arrows 34 which may be numbered is provided along the line of the strip 27. The first arrow in front of the upturned flange 28 during scanning operation indicates the direction of scanning and the number of such arrow identifies the Y co-ordinate of the scanning operation. To provide identification of the X co-ordinate, alphabetical letters may be provided along the bottom edge of the front shield 35. Thus full co-ordinate identification of the platform position can be obtained thereby enabling a "fault" location on a film negative or printed circuit board to be readily returned to.

Furthermore, it is convenient to arrange that the projection lens system affords a specified magnification (e.g. 10 × 1) so that it is possible to make arrangements on the viewer screen by using a switchable gauge or graticule.

What we claim is:

1. An optical device for facilitating corrective operations on a substantially flat object, which comprises: a base structure; an object-conveyor member including an object-supporting element having a flat surface for supporting such object; object-scanning means including two linear guiding means respectively adjustably guiding said conveyor member relative to said base structure in two mutually perpendicular co-ordinate directions, both parallel to said surface; a projection screen exposed to the view of an operator, first optical means supported in said base structure and forming on said screen an enlarged objective image of a small portion of said surface, when said small portion is in a predetermined position relative to said first optical means; illuminating means for illuminating at least that portion of said surface of which an enlarged objective image is thus formed by the first optical means; second optical means forming an enlarged virtual image of small portion of said surface displaced within said surface by a predetermined distance in a predetermined direction from the portion of which the first optical means form such objective image, said virtual image being substantially aligned in the view of an observer with the actual position of said small surface portion; and two-position change-over means which, when moved from a first one of its two positions to its other position, displaces, without affecting the adjusted position of said object-scanning means, said object-supporting element be said predetermined distance in said predetermined direction, whereby an enlarged steroscopic virtual image of the previously projected small portion of said surface becomes available for viewing through said second optical means.

2. A device as claimed in claim 1, wherein said second optical means include a pair of binoculars mounted in the device.

3. A device as claimed in claim 1, wherein the optical axis of said second optical means is inclined to the direction normal to the said surface, thus giving a view of part of the inside of perforations of a printed-circuit board placed on said surface.

4. An optical device as claimed in claim 1, wherein said two-position change-over means are interposed between said conveyor member and said object-supporting element.

5. A device as claimed in claim 1, wherein said conveyor member includes a bottom part movable by said scanning means and a top part constituting said object-supporting element, said top part being mounted on said bottom part for sliding movement relative thereto by said two-position change-over means from said first position to said other position and from said other position to said first position.

6. An optical device for facilitating corrective operations on a substantially flat object, which comprises: a base structure; an object-conveyor member including an object-supporting element having a flat surface for supporting such object; object-scanning means including two linear guiding means respectively adjustably guiding said conveyor member relative to said base structure in two mutually perpendicular co-ordinate directions, both parallel to said surface; a projection screen exposed to the view of an operator, first optical means supported in said base structure and forming on said screen an enlarged objective image of a small portion of said surface, when said small portion is in a predetermined position relative to said first optical means; illuminating means for illuminating at least that portion of said surface of which an enlarged objective image is thus formed by the first optical means; second optical means forming an enlarged virtual image of a small portion of said surface displaced within said surface by a predetermined distance in a predetermined direction from the portion of which the first optical means form such object image, said virtual image being substantially aligned in the view of an observer with the actual position of said small surface portion; a two-position change-over means which, when moved from a first one of its two positions to its other position, displaces, without effecting the adjusted position of said object-scanning means, said object-supporting element by said predetermined distance in said predetermined direction, whereby said enlarged steroscopic virtual image of the previously projected small portion of said surface becomes available for viewing through said second optical means; and locking means for locking said object-scanning means in an adjusted position while still permitting operation of said two-position change-over means.

* * * * *